O. HENKER.
MACHINE FOR ANGULAR GRINDING SPECTACLE GLASSES.
APPLICATION FILED AUG. 13, 1921.

1,409,546.

Patented Mar. 14, 1922.
2 SHEETS—SHEET 1.

Inventor:
Otto Henker

O. HENKER.
MACHINE FOR ANGULAR GRINDING SPECTACLE GLASSES.
APPLICATION FILED AUG. 13, 1921.

1,409,546.

Patented Mar. 14, 1922.

2 SHEETS—SHEET 2.

Inventor:
Otto Henker

UNITED STATES PATENT OFFICE.

OTTO HENKER, OF JENA, GERMANY, ASSIGNOR TO THE FIRM OF CARL ZEISS, OF JENA, GERMANY.

MACHINE FOR ANGULAR GRINDING SPECTACLE GLASSES.

1,409,546.  Specification of Letters Patent.  Patented Mar. 14, 1922.

Application filed August 13, 1921. Serial No. 492,189.

*To all whom it may concern:*

Be it known that I, OTTO HENKER, a citizen of the German Empire, residing at Jena, Germany, have invented a new and useful Machine for Angular Grinding Spectacles Glasses, for which I have filed application in Germany April 6, 1918, and of which the following is a specification.

The present invention relates to a machine intended for providing a non-circular spectacle-glass with an angular edge, i. e., a glass in which a cross-section through a cylindrical surface passing through the glass-rim, the straight lines on this surface being parallel to the axis of the glass, forms an ellipse for instance. On the shaft of this machine, which carries the glass, which rotates on being ground, a plane cam is disposed, limiting the grinding by contacting with a stop the moment the desired grinding at the particular part of the rim-surface being operated upon is accomplished, and this shaft may be swung about an axis, which intersects it perpendicularly, and which crosses the axis of the grindstone perpendicularly. The term angular edge denotes that line in which the two rim-surfaces intersect one another, irrespective of whether this line actually exists on the spectacle-glass itself or would only be formed beyond it. A machine of the above kind has become known through the German Patent 237190 Eckstein Aug. 29, 1911. However, whilst in this known machine the stop retains its position during the grinding operation, and the cam is rigidly fixed to the shaft carrying it, in the new machine the stop is rotatable about an axis, which is parallel to the axis of oscillation alluded to of the shaft carrying the glass, in a variable distance from this axis, and which lies in the plane determined by this axis of oscillation and the point which the angular edge has in common with the grinding surface, and, in addition, the cam is displaceable longitudinally on its shaft, and by means of the stop compelled to permanently contain in its plane the axis of rotation of the stop, on the shaft being revolved.

Figure 1:
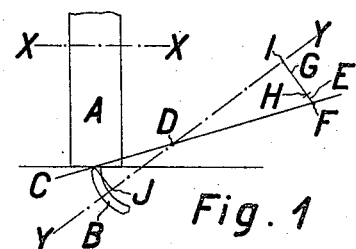
Figure 2:
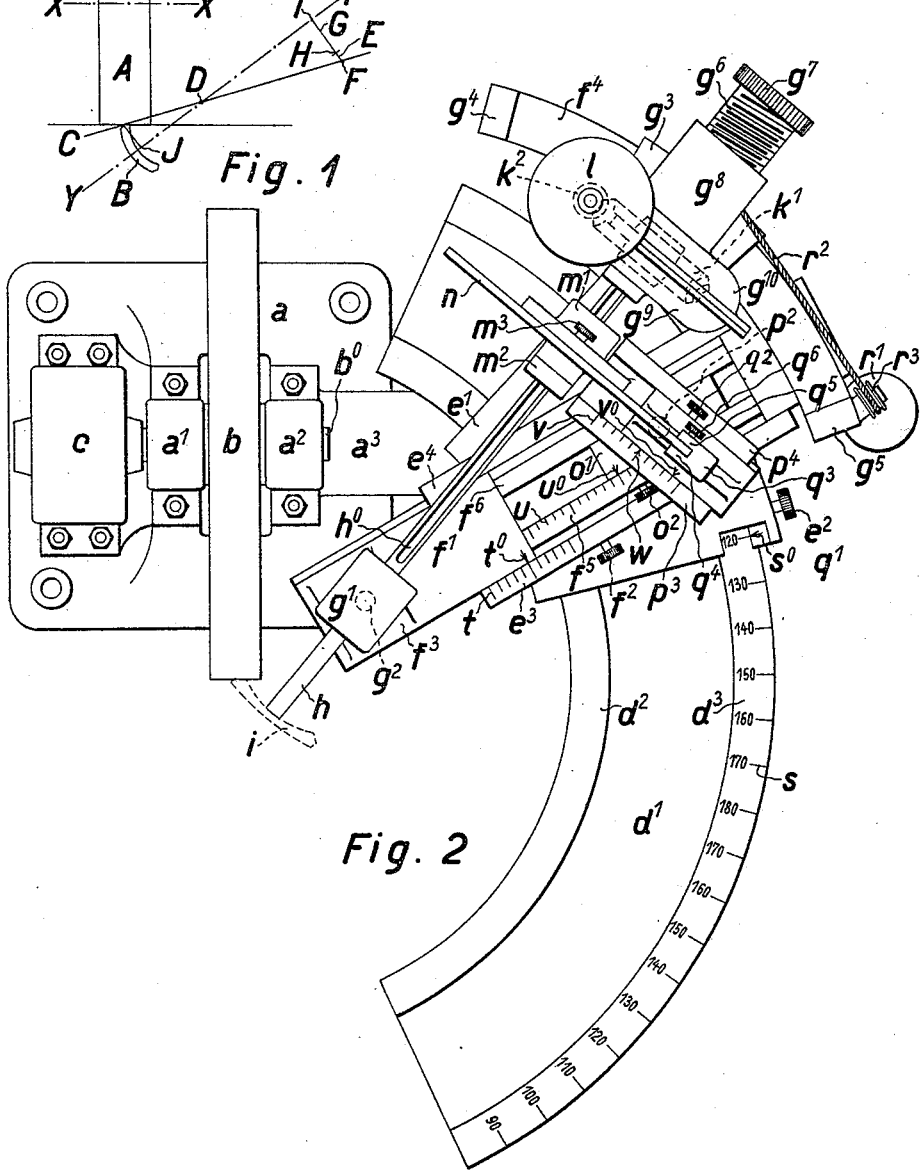
Figure 3:
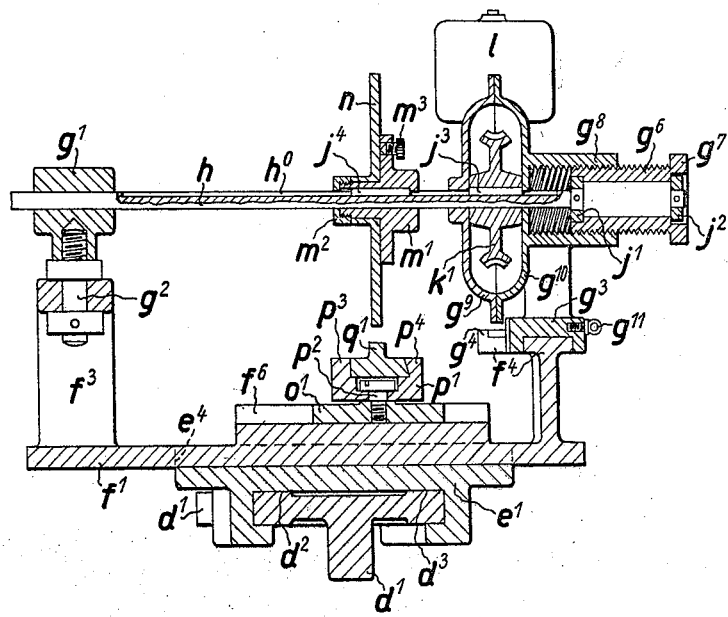
Figure 4:
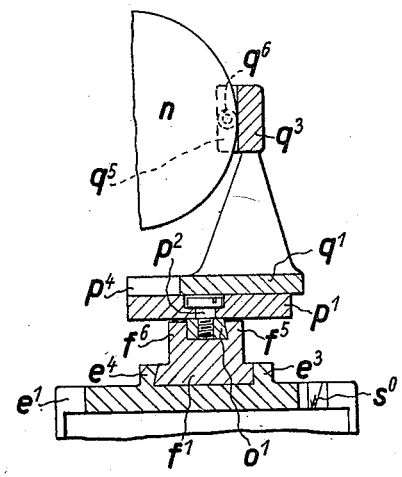

In the annexed drawings: Fig. 1 shows diagrammatically an example of how a machine according to the present invention may be arranged; Fig. 2 shows in plan a constructional example of a machine according to the invention of the more developed form; Fig. 3 shows a vertical cross-section through a part of the machine of Fig. 2; Fig. 4 shows a vertical cross section through another part of the machine of Fig. 2, whereby in Figs. 3 and 4 for the sake of clearness the relative position of certain parts is chosen somewhat differently as compared with Fig. 2.

The different possibilities of arrangement of the new machine may be elucidated, reference being had to Fig. 1 of the drawing. In the said figure the grindstone is marked A, its axis of rotation, X X. The spectacle-glass to be ground, B, rotates during the grinding about an axis Y Y; the glass is shown ready ground. C indicates the point which the angular edge of the glass has in common with the grinding surface. D signifies the axis which is perpendicular to the drawing-plane and about which the axis Y Y may be swung. The stop is marked E, and its axis of rotation, which is perpendicular to the drawing-plane, and parallel to the axis of oscillation D, is marked F. The point F lies, as is essential for the new machine, in a straight line along with C and D. The cam, which permanently contains in its plane the axis of rotation F, and which is displaceable along the axis Y Y, is marked G, the point in which it contacts with the stop E is marked H, and the point in which its plane intersects the axis Y Y is marked I. Besides, from the point C the perpendicular CJ is dropped on Y Y. As may be inferred from the drawing, the following equation holds good—

$$\frac{CJ}{HI+FH}=\frac{CD}{DF}.$$

For the carrying out of the new machine first of all a special case arises. This special case is characterized by the straight line FH always being zero, hence, by the point in which the cam contacts with the stop invariably falling into the axis of rotation of the stop. The above mentioned equation then changes into the following equation:

$$\frac{CJ}{HI}=\frac{CD}{DF}.$$

Consequently, with the new machine a set of spectacle-glasses is obtained, which glasses vary in size according to the chosen length of the straight lines CD and DF respectively, but approximate to the cam as regards their shape, and moreover, for this whole set one single cam will suffice, quite independent of the median curvature of the spectacle-glass to be ground, while by means of the machine described in the patent specification 237190 this approximation is obtained only in the case of the median curvature of the spectacle-glass agreeing with that of the cam.

If, however, the machine, deviating from this special case, is arranged in such a manner that the straight line FH is variable as regards its length, then for every value of the fraction $\frac{CD}{DF}$ a set of spectacle-glasses is obtained which glasses vary in size according to the length of the straight line FH, but agree as regards their shape inasmuch as any glass of each set differs from another glass of the same set merely by the length of its radius vector (which varies across the glass) deviating from that of the other glass by an invariable amount. The various sets which are obtained according to the value of the fraction $\frac{CD}{DF}$ completely differ from one another, so that any glass out of one of the sets does not at the same time belong to another set. For that particular glass of every set for which FH is zero the machine corresponds to the special case as dealt with above. Hence, the shape of this glass again approximates to the cam. With a machine arranged this way it is possible for instance (within certain limits given by the various possibilities of adjustment of the machine) to complete by means of one single oval cam any oval spectacle glass of any median curvature, as long as, e. g., no more is required than that the two main axes of this glass have certain definite values, or that the circumference of this glass has a certain definite value. In the case of the known machines, on the contrary, for every glass a special cam was required, if glasses having no symmetrical cross-section were dealt with.

About the values which in the case of a given cam and of a chosen value of the straight line CD have to be given to the straight lines DF and FH the following may be observed, by way of example for oval spectacle-glasses. The radius vector C J of the spectacle-glass, which happens to lie in the drawing-plane, may be major semi-axis of the glass, and the radius vector H I of the cam, which happens to lie in the drawing plane, the major semi-axis of the cam; the respective minor semi-axes, which happen to be perpendicular to the drawing plane, may be marked C′J and H′I. As mentioned above—

$$\frac{CJ}{HI+FH}=\frac{CD}{DF};$$

correspondingly—

$$\frac{C'J}{H'J+FH}=\frac{CD}{DF}.$$

In the case of a given cam, therefore H I and H′ J being given, of a chosen value of C D, and of predetermined axes of the spectacle-glass, therefore C J and C′ J being predetermined there results from the said equations—

$$DF=CD\cdot\frac{HI-H'I}{CJ-C'J}$$

and—

$$FH=\frac{C'J\cdot HI-CJ\cdot H'I}{CJ-C'J}.$$

As a matter of course the new machine, although its proper significance lies in the grinding of non-circular spectacle-glasses, may as well be utilized for grinding circularly shaped spectacle-glasses. If for the grinding of such glasses the use of a special circular cam is to be avoided, any non-circular cam will do, if releasably coupled to the shaft carrying the glass, so that when disengaged it takes no part in the rotation of the shaft, and if this cam be fixable relatively to the stop. The fixed cam will then act the same as a circular cam having a radius equal to that particular radius vector of the fixed cam with the end-point of which the cam contacts with the stop.

In Figs. 2 to 4 of the drawing the invention is illustrated by means of a constructional example, which represents a machine of the more developed form, i. e. none corresponding only to the special case as dealt with above.

A base-plate $d$ carries two bearings $a^1$ and $a^2$, in which a shaft $b^0$ carrying a grindstone $b$ is supported. An electric motor $c$ serves for driving this grindstone. A bracket $a^3$ fixed to the body of the bearing $a^2$ carries a table $d^1$, which has the shape of a circular ring segment, the axis of the circular ring contacting with the convex surface of the grindstone $b$. On two sliding surfaces $d^2$ and $d^3$ of this table a carriage $e^1$ is displaceably disposed, a clamping screw $e^2$ serving for fixing it. Between two guides $e^3$ and $e^4$, which are fixed to the carriage $e^1$, there is a carriage $f^1$ displaceably disposed, a clamping screw $f^2$ serving for fixing it. To a stand $f^3$, which is fixed to one end of the carriage $f^1$, a bearing $g^1$ is by the aid of a bolt $g^2$ so fitted that it may be swung about a vertical axis. On the other end of the carriage $f^1$ a sliding surface $f^4$ is provided, having the shape of a circular ring segment, the axis of the circular ring coinciding with the axis of the bolt $g^2$. A carriage $g^3$ is so disposed as to be displaceable longitudinally on this sliding surface, two stops $g^4$ and $g^5$ limiting its way. A shaft $h$ intended for carrying on one of its ends the spectacle-glass to be ground, marked I, (indicated in the drawing in dotted lines) is at this end journalled in the bearing $g^1$, and at its other end, on the one hand, supported in a bushing $g^6$, which at its end is fitted with a milled head $g^7$, and which by means of threaded parts engages in a part $g^8$, which has a female thread and is fitted to the carriage $g^3$, and, on the other hand, supported in the lid $g^9$ of a casing $g^{10}$, which is carried by the said part $g^8$. Two rings $j^1$ and $j^2$ prevent the shaft $h$ from being displaced in the bushing $g^6$. By means of a key $j^3$, which engages in a groove $h^0$ of the shaft $h$, this shaft has a worm-wheel $k^1$ so fitted to it that it can be displaced relatively to the worm-wheel. An electric motor $l$ fixed to the casing $g^{10}$ serves along with a worm $k^2$, which engages with the worm-wheel $k^1$, for driving the shaft $h$. A bushing $m^1$ is by means of a key $j^4$ engaging in the groove $h^0$ so fitted to the shaft $h$ as to be displaceable relatively to this shaft. On the bushing $m^1$ there is a plane elliptically shaped cam $n$ rotatably disposed, a nut $m^2$ preventing it from being displaced relatively to this bushing. A screw $m^3$ permits of the cam to be secured to the bushing. Between two guides $f^5$ and $f^6$, which are disposed on the carriage $f^1$, and which are parallel to the guides $e^3$ and $e^4$, a carriage $o^1$ is displaceably disposed, a clamping screw $o^2$ serving for fixing it. To this carriage a sliding surface $p^1$ is rotatably fitted by the aid of a screw-bolt $p^2$, the axis of which lies in the plane containing the axis of the table $d^1$ and the axis of the bolt $g^2$. The sliding surface $p^1$ carries two guides $p^3$ and $p^4$, between which a carriage $q^1$ is displaceably disposed, a clamping screw $q^2$ serving for fixing it. This carriage carries a stop $q^3$, which embraces the cam $n$ by means of two projections $q^4$ and $q^5$; a screw $q^6$ permits of the cam to be clamped on the stop. A weight $r^1$ is by means of a cord $r^2$, which passes over a roller $r^3$, which is supported by the stop $g^5$, fastened to a ring $g^{11}$, which is fixed to the carriage $g^3$, and under its action the cam $n$ is pressed toward the stop $q^3$. The position of the carriage $e^1$ is indicated on a graduation $s$ by means of an index $s^0$, which indicates the value 180 in the case of the plane containing the axis of the bolt $g^2$ and that of the screw-bolt $p^2$ being parallel to the straight lines on the convex surface of the grindstone $b$. The numbering of the scale $s$ advances from the 180-division to either side in the reverse sense, in such a manner that the difference between any two figures is as big again as the corresponding angular difference. Three graduations $t$, $u$ and $v$ and three indices $t^0$, $u^0$ and $v^0$ serve for indicating the position of the carriages $f^1$, $o^1$ and $q^1$ respectively; on the graduation $v$ that particular division $w$ is rendered conspicuous at which the index $v^0$ points in the case of the axis of the bolt $p^2$ falling into that surface of the stop $q^3$ which faces the cam.

About the manipulation of the new machine the following may be observed with reference to the constructional example. The spectacle-glass $i$ having been cemented onto the head of the shaft $h$, by turning the milled head $g^7$ the shaft $h$ is so set in the direction of its axis that the distance apart of the spectacle-glass and the bolt $g^2$ is smaller than the radius of the weaker curved limiting-surface of the glass and larger than the radius of the stronger curved limiting-surface of the glass, and the carriage $f^1$ is so set that the glass receives the proper position relatively to the grindstone. Furthermore, the cam $n$ is to be clamped on the bushing $m^1$ by the aid of the screw $m^3$, and the screw $q^6$ is to be released. The carriages $o^1$ and $q^1$ are then so to be set that the distance of the axis of the screw-bolt $p^2$ from the axis of the bolt $g^2$, and the displacement of the carriage $q^1$ out of that position in which the index $v^0$ points at the division $w$ of the graduation $v$ receive those respective values previously ascertained for the straight lines DF and FH of Fig. 1 which correspond to the semi-axes of the cam and to the desired semi-axes of the spectacle-glass. At last the carriage $e^1$ is so to be set that the index $s^0$ indicates on the graduation $s$ that angle (in the example of the drawing an angle of 120°) which is to be formed by the two rim-surfaces of the glass; to each angle belong two divisions on the graduation $s$, one for the one rim-surface and the other for the second rim-surface. The constructional example of the drawing showing the angular grinding of the spectacle-glass completed, it would have to be assumed that the grinding of the rim-surface which in the drawing happens to be contacting with the grindstone had been preceded by the grinding of the other rim-surface, namely, in that position of the carriage $e^1$ in which the index had pointed at the other 120-division.

When the carriage $e^1$ is so set that the index $s^0$ points at the (only) 180-division of the graduation $s$, a glass will be received, the two rim-surfaces of which concur in one single surface.

When spectacle-glasses are dealt with, the shape of which is similar to the cam, the position of the carriage $q^1$ must be such that the index $v^0$ points at the division $w$ of the graduation $v$. The position of the carriage $f^1$ is again to be ascertained by the aid of the equation—

$$DF = CD \cdot \frac{HI - H'I}{CJ - C'J},$$

which may be substituted by the equation—

$$DF = \frac{CD}{Z}.$$

In this equation Z signifies the value of the ratio of the radii vectors of the spectacle-glass to those of the cam; hence $$Z = \frac{CJ}{HI} = \frac{C'J}{H'I}.$$

When, without changing the cam, a circular spectacle-glass is to be ground by means of the machine shown in the drawing, the screw $m^3$ has to be released, and the cam $n$, in any desired place thereof, has to be secured to the stop $q^3$ by means of the screw $q^6$, the carriage $q^1$ having any desired position. Thereupon the carriage $f^1$ has to be set in such a manner that—

$$\frac{C_0 J}{H_0 I + FH} = \frac{CD}{DF},$$

hence—

$$DF = CD \frac{H_0 I + FH}{C_0 J},$$

whereby DF, CD and FH denote the values previously stated, $C_0J$ signifies the radius of the spectacle-glass to be produced and $H_0I$ that particular radius vector of the cam with the end-point of which the cam contacts with the stop.

I claim:

1. In a machine intended for angular grinding spectacle-glasses of non-circular shape, a plane cam, a stop, a grindstone, and a shaft designed for holding the spectacle-glass, the said cam co-operating with the stop and being disposed on the said shaft, which is free to oscillate about an axis by which it is intersected perpendicularly and the axis of the grindstone crossed perpendicularly, the said stop being rotatable about an axis, which is parallel to the axis of oscillation of said shaft and at a variable distance from it, and which lies in the plane determined by the said axis of oscillation and by the point which the angular edge of the spectacle-glass has in common with the grinding surface, the said cam being displaceable longitudinally on its shaft and being compelled by the stop to permanently contain in its plane the axis of rotation of the stop, on the said shaft being rotated.

2. In a machine intended for angular grinding spectacle-glasses of non-circular shape, a plane cam, a stop, a grindstone, and a shaft designed for holding the spectacle-glass, the said cam co-operating with the stop and being disposed on the said shaft, which is free to oscillate about an axis by which it is intersected perpendicularly and the axis of the grindstone crossed perpendicularly, the said stop being rotatable about an axis, which is parallel to said axis of oscillation of said shaft and at a variable distance from it, and which lies in the plane determined by the said axis of oscillation and by the point which the angular edge of the spectacle-glass has in common with the grinding surface, the said cam being displaceable longitudinally on its shaft and being compelled by the stop to permanently contain in its plane the axis of rotation of the stop, on the said shaft being rotated.

3. In a machine intended for angular grinding spectacle-glasses of non-circular shape, a plane cam, a stop, a grindstone, and a shaft designed for holding the spectacle-glass, the said cam co-operating with the stop and being disposed on the said shaft so that it may be uncoupled from it and fixed relatively to the stop, the said shaft being free to oscillate about an axis by which it is intersected perpendicularly and the axis of the grindstone crossed perpendicularly, the said stop being rotatable about an axis, which is parallel to the axis of oscillation of said shaft and at a variable distance from it, and which lies in the plane determined by the said axis of oscillation and by the point which the angular edge of the spectacle-glass has in common with the grinding surface, the said cam being displaceable longitudinally on its shaft and being compelled by the stop to permanently contain in its plane the axis of rotation of the stop, on the said shaft being rotated.

OTTO HENKER.

Witnesses:
PAUL KRÜGER,
RICHARD HAHN.